(12) United States Patent
Baumgartner et al.

(10) Patent No.: US 8,249,791 B2
(45) Date of Patent: Aug. 21, 2012

(54) METHOD FOR DETERMINING THE COEFFICIENT OF FRICTION OF DISK BRAKES

(75) Inventors: Johann Baumgartner, Moosburg (DE); Aleksandar Pericevic, Starnberg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 939 days.

(21) Appl. No.: 12/159,536

(22) PCT Filed: Dec. 22, 2006

(86) PCT No.: PCT/EP2006/012436
§ 371 (c)(1),
(2), (4) Date: Nov. 25, 2008

(87) PCT Pub. No.: WO2007/073927
PCT Pub. Date: Jul. 5, 2007

(65) Prior Publication Data
US 2009/0152054 A1    Jun. 18, 2009

(30) Foreign Application Priority Data
Dec. 27, 2005    (DE) .......................... 10 2005 062 416

(51) Int. Cl.
*G06F 7/00*    (2006.01)
*B60T 17/22*   (2006.01)

(52) U.S. Cl. ........................................ 701/80; 188/72.3

(58) Field of Classification Search ................... 701/70, 701/73, 80; 303/139, 149–151; 188/72.3
See application file for complete search history.

(56) References Cited

U.S. PATENT DOCUMENTS

| 5,582,273 A | 12/1996 | Baumgartner et al. |
| 7,344,011 B2 | 3/2008 | Naude |
| 2011/0005871 A1* | 1/2011 | Pericevic et al. ............ 188/71.8 |

FOREIGN PATENT DOCUMENTS

| DE | 3610569 A1 | 10/1987 |
| DE | 3716202 A1 | 11/1988 |
| DE | 101 51 950 A1 | 5/2003 |
| EP | 0 688 404 B1 | 12/1995 |
| WO | WO 94/21936 A1 | 9/1994 |
| WO | WO 02/14708 A2 | 2/2002 |
| WO | WO 03/100282 A | 12/2003 |
| WO | WO 2005/017383 A | 2/2005 |

OTHER PUBLICATIONS

International Preliminary Report on Patentability (Chapter I) with English translation (Fifteen (15) pages).
International Search Report with English translation dated Mar. 27, 2007 (Four (4) pages).

* cited by examiner

*Primary Examiner* — Yonel Beaulieu
(74) *Attorney, Agent, or Firm* — Crowell & Moring LLP (57) ABSTRACT

A method for determining the friction value of a disk brake, in particular of self-energizing disk brakes, in which the friction value is determined on the basis of the: motor current for the application direction and retraction direction, idle current $I_0$, wedge angle α, transmission constant K, and clamping force.

14 Claims, 4 Drawing Sheets

METHOD FOR DETERMINING THE COEFFICIENT OF FRICTION OF DISK BRAKES

CROSS-REFERENCE TO RELATED APPLICATIONS

This application is a U.S. National Phase of PCT International Application No. PCT/EP2006/012436, filed on Dec. 22, 2006, which claims priority under 35 U.S.C. §119 to German Application No. 10 2005 062 416.2, filed Dec. 27, 2005, the entire disclosures of which are expressly incorporated by reference herein.

BACKGROUND AND SUMMARY OF THE INVENTION

The invention relates to a method for determining the coefficient of friction of disk brakes, in particular of disk brakes of a self-energizing design.

In fluidically activated drum brakes and disk brakes which are customary in series production, the braking effect of the individual wheel brakes is approximated, for example, computationally assuming what is referred to as a "calculation coefficient of friction" exclusively by measuring the brake application forces of the respective brake. The brake application forces are determined indirectly by sensing the activation pressure on the hydraulic or pneumatic brake cylinder.

Deviations of the average coefficient of friction of all the brakes of a brake system can be determined by comparing the predefined deceleration and the achieved deceleration. The achieved deceleration is determined here by evaluating the rotational speed behavior of the wheels using the rotational speed sensors which are present in the brake system, and said achieved deceleration is calculated in a computing unit, for example an ABS or EBS system.

However, it is not possible to make definitive statements about the actual coefficient of friction behavior of individual brakes of the vehicle. Different deviations of the coefficient of friction behavior of the brakes of one axle, between the brakes of the individual vehicle axles or between the brakes of a towed vehicle with respect to a towing vehicle can have very adverse effects on the coordination of the brakes.

This fact is of particular importance in brakes which use self-energizing effects to reduce the activation energy because in such brakes the problem occurs that the differences in coefficient of friction are also amplified so that deviations of the actual coefficient of friction from the calculation coefficient of friction form an excessive proportion of the braking effect which is achieved by the respective brake.

Methods are already known in which, taking into account the cause and effect relationship $$F_R = \mu \cdot F_N$$

$$\mu = \frac{F_R}{F_N}$$

$F_N$:=normal force (tensioning force) of the brake
$F_R$:=frictional force (circumferential force on the brake disk)
$\mu$:=coefficient of friction of brake lining/brake disk,
the value of $\mu$ can be determined through direct or indirect measurement of $F_R$ and $F_N$.

The direct determination is carried out, for example, in the measurement of, for example, component tension by means of sensors which are used specifically for that purpose.

The indirect measurement is carried out, for example, by means of an evaluation of available data, for example using data relating to the current consumption and to the position of the drive motor, from which data the variables to be determined can be obtained on the basis of a given cause and effect relationship using, to a certain extent, complex computing operations. Such a solution is proposed by German Patent Publication No. DE 101 51 950 A1.

The disadvantage of direct determination is the cost of additional sensors and the increased susceptibility of the system to errors.

Indirect determination is based on very complex cause and effect relationships which are severely susceptible to errors owing to a large number of influencing variables and require very costly computing operations.

In the abovementioned document German Patent Publication No. DE 101 51 950 A1, there is also a description of a possibility of replacing the determination of the frictional force by a cause and effect relationship between the frictional force and actuator force in conjunction with the coefficient of friction and the employed wedge angle of the self-energizing mechanism. This relationship can be used in self-energizing mechanisms in which the actuator force acts parallel to the frictional surface, that is to say does not have a direct effect on the tensioning force of the brake.

The coefficient of friction can then be determined from the relationship $$\mu = \tan\alpha - \frac{F_A}{F_N}; \alpha := \text{wedge angle}; F_A = \text{actuator force}.$$

The actuator force and the normal force can be determined from the current consumption (actuator force) and the position of the drive motor (normal force) without an additional sensor system. However, close consideration shows that this determination is subject to relatively large errors.

In addition to fabrication-related tolerances of the motor, operating influences of the motor, in particular its temperature and a series of mechanical efficiency values of the step down gear mechanism and adjustment mechanism, also play a part in the relationship between the motor current and actuator force.

The relationship between the actuator position and the normal force (tensioning force) of the brake is determined by the overall elasticity of the spread-apart brake caliper. In addition to the tolerances of the brake caliper and of the brake application system of the brake, this relationship is also influenced by the deformation behavior of the brake linings. In addition to the wear state of the brake linings, their compressibility is influenced to a great degree by the temperature in the lining material. The temperature dependence is nonlinear and the temperature distribution in the lining material is nonhomogenous as a function of time owing to the relatively low conductivity of heat of the customary organically bound brake linings.

Idle travel, which the actuator has to overcome during the brake application movement, and the possible variations in the value of this idle travel are very disruptive to the determination of the tensioning force (normal force) of the brake by means of the actuator position. Such idle travel is, in particular, the air clearance of the brake and the play which occurs in various ways in the transmission path from the drive motor to the actual activation element of the brake.

Since the actuator position, i.e. the position of the activation element, is brought about by sensing the angular position of the drive motor taking into account the overall transmission ratio between the motor and actuator, an incorrect determination of the position also results in an error. With the incremental position signal transmitters which are generally used, particularly high-dynamic adjustment processes may lead to individual angular steps which are carried out by the drive motor being sensed incorrectly. Such errors can add up when there are repeated adjustment processes and therefore lead to unacceptable deviations of the actuator position.

Since in the relationship on which the determination of $\mu$ is based $$\mu = \tan\alpha - \frac{F_A}{F_N}$$

both determination variables $F_A$ and $F_N$ can be determined only with very large errors, the determination of the coefficient of friction according to the described method is inadequate.

Against this background, the object of the invention is to provide a method for determining the coefficient of friction of the brake lining of disk brakes, in particular of self-energizing disk brakes, which method preferably permits reliable and sufficient information to be obtained about the coefficient of friction of the brake lining without an additional sensor system and by using unambiguous and simple cause and effect relationships.

According to the invention, the coefficient of friction is determined using the following variables:

motor current for brake application direction and retraction direction $I_{applic}, I_{ret}$
no load current $I_0$
wedge angle $\alpha$
transmission constant K
tensioning force $F_N$.

This way of determining the coefficient of friction which is simple and yet sufficiently accurate for practice is possible in particular under defined conditions during test brake activations which are initiated specifically for this purpose.

The combination with air clearance adjustment processes provides the advantage that in this context the brake linings are in any case applied briefly with little force to the brake disk. In this situation, all the disruptive idle travel, including the air clearance, is eliminated from the tensioning force transmission path. Taking into account the wear state, which has been determined by the electronically controlled adjustment system, and the temperature state which is known for the time of the test brake activation, the actuator is moved into an actuator position which, under the known peripheral conditions, results in a predefined value of the tensioning force which remains the same for all the test brake activations.

Other objects, advantages and novel features of the present invention will become apparent from the following detailed description when considered in conjunction with the accompanying drawings.

DETAILED DESCRIPTION

Figure 1:
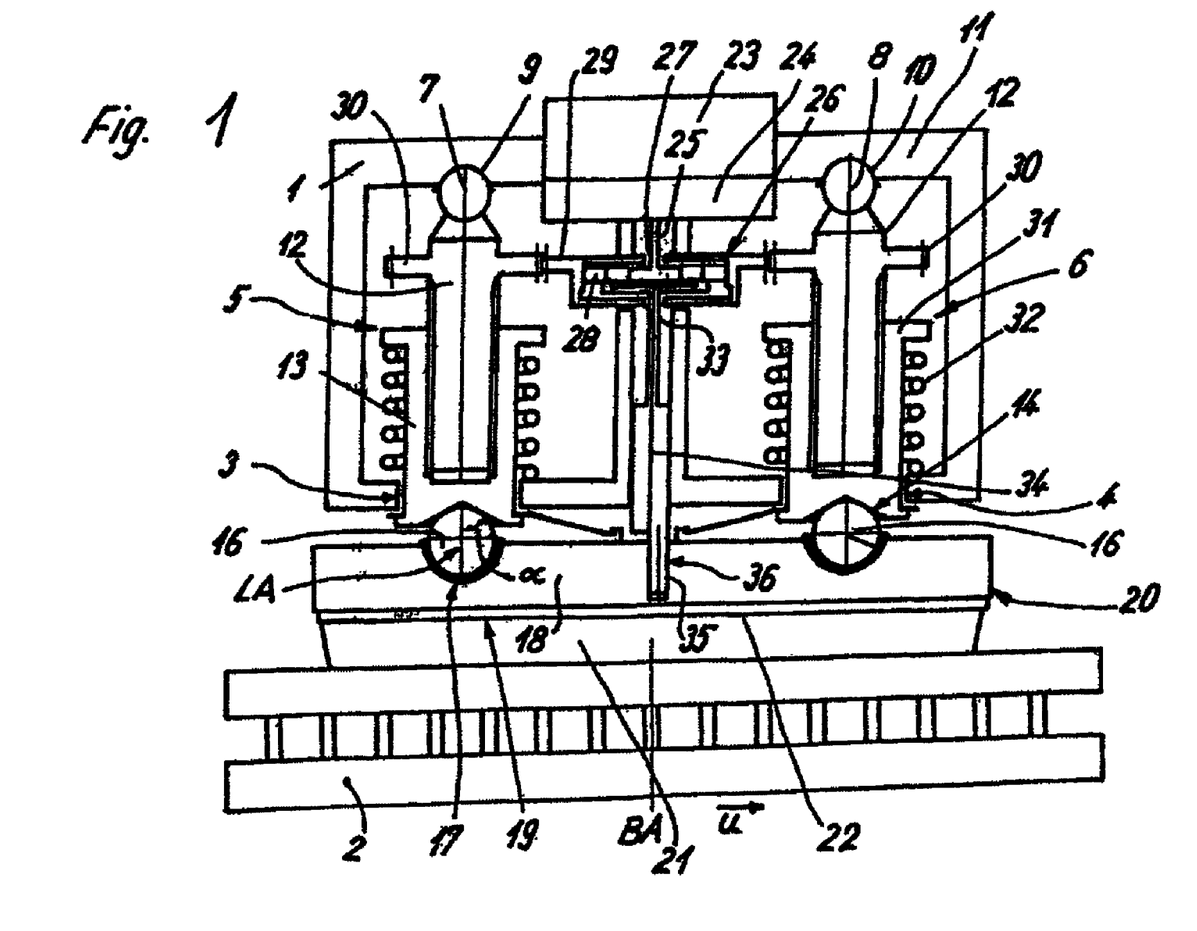
FIG. 1 is a sketch illustrating the basic design of a disk brake with self-energization.
Figure 2:
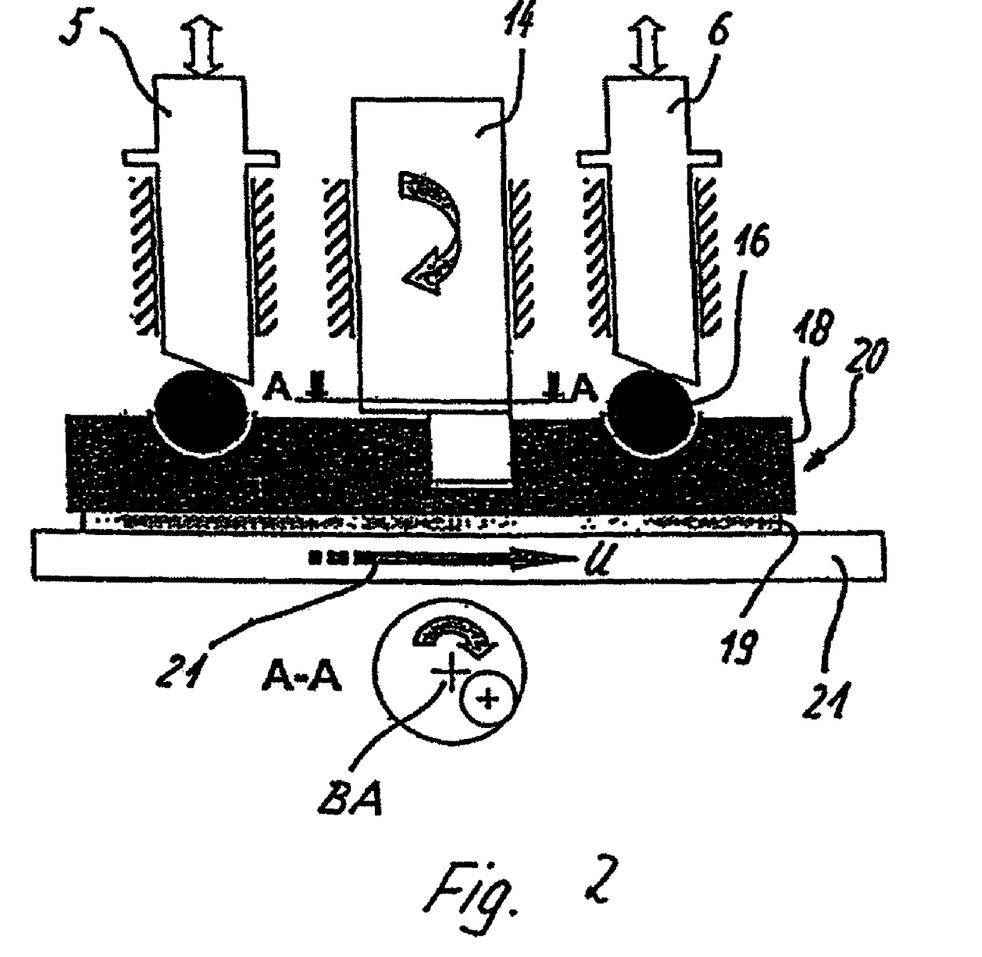
FIG. 2 is a basic sketch of the action principle of the brake from FIG. 1.

The method according to the invention is suitable in particular for a self-energizing disk brake as illustrated in FIG. 1. Firstly, the functional principle in FIG. 1 will therefore be described in more detail with a nonadjustable ramp gradient in the pressure surfaces 5, 6 of the brake plungers. Adjustable pressure plungers for changing the ramp gradient are conceivable, but not shown here. FIG. 2 illustrates the basic functional principle in conjunction with FIG. 1.

The disk brakes according to the invention are preferably based on a fixed caliper concept in which a single-component or multi-component brake caliper 1 (also referred to as brake housing) is attached to a wheel axle so as to be immobile in relation to a brake disk 2. The basis of the concepts which are described below is to this extent a fixed caliper brake with an external means for wear compensation adjustment which is actuated electromechanically and controlled electronically. The principle of action and the described features can basically also be used for other types of brake, for example sliding caliper brakes or pivoting caliper brakes. Only the caliper head, which includes the brake activation means, of the mechanically/pneumatically activated basic brake is replaced by the electromechanical brake application unit with self-energization. A fixed caliper brake with pneumatically activated brake application device of this type can be found in, for example, German Patent Publication Nos. DE 36 10 569 A1, DE 37 16 202 A1 or European Patent Publication No. EP 0 688 404 A1. A fixed caliper brake with electromotive adjustment can be found in International Patent Publication No. WO 02/14 708 A1. Such electromotive adjustment devices can respectively be arranged on the reaction side in the proposed exemplary embodiments if desired. It is also even possible to arrange just a single adjustment device with an electric motor as drive on the reaction side. This variant is particularly cost-effective and economical in terms of installation space in particular in a disk brake with a self-energizing device, an electromotive actuator and with a fixed caliper. In this context the brake application side and the reaction side brake lining can also have different thicknesses.

In FIG. 1, the brake caliper 1 is indicated only in its brake application side area. In practice, it preferably engages around the upper circumferential area of the brake disk in the manner of a frame and is attached to an axle flange (not illustrated here).

The brake caliper 1 has, on its side facing the brake disk 2 with a brake disk rotational axis, one or more, preferably two openings 3, 4 and a corresponding number of brake plungers 5, 6 (in this case two) which are aligned parallel to the brake disk axis BA.

According to FIGS. 1 to 4, in each case two brake plungers 5, 6 are arranged parallel to one another.

The two brake plungers 5, 6 and adjustment pistons are each supported directly or by means of intermediately connected elements; here sliding bearing shells 9, 10; on the rear wall 11 of the brake caliper which faces away from the brake disk. Preferably balls 7, 8 with sliding bearing shells 9 are used as the bearing devices.

The bearing devices are configured in such a way that they permit the brake plungers 5, 6 or adjustment pistons to rotate about their own longitudinal axis LA.

In this context, spherical segment like (spherical cap like) recesses are formed in each case in the brake plunger 5, 6 and in the brake caliper, into one recess of which (in this case the one in the brake caliper) the sliding bearing shells 9, 10 are inserted so that the balls 7, 8 can rotate relative to the sliding bearing shell.

Alternatively, the balls 7, 8 can also be embodied as spherical attachments (not illustrated here) on the ends of the brake plungers 5, 6 which face the brake caliper, said attachments then engaging in corresponding recesses in the brake caliper with sliding bearing shells.

Instead of the balls and recesses, planar sliding bearings or annular bearings or the like (not illustrated here) are also conceivable.

The brake plungers 5, 6 each have a spindle 12 which is provided with an external thread and on which a sleeve like nut 13 with a corresponding internal thread is rotatably arranged. Depending on the configuration, this thread may be nonself-locking or self-locking.

On their side facing away from the brake disk, the nuts 13 have a flange 31 in which in each case compression springs 32 act between the flange 31 and the internal wall of the brake caliper 1, said compression springs 32 surrounding the nut 13 concentrically and applying a predefined force to the flange or pretensioning the flange 31 relative to the internal wall of the brake caliper.

Alternatively, the entire mechanism is braced against the pressure plate.

According to FIGS. 1 to 4, the nut 13 of each brake plunger 5, 6 is arranged on the side facing the brake disk, and the spindle 12 is arranged on the side facing the interior of the brake caliper. A reverse arrangement would also be conceivable (not illustrated here).

By screwing the nut 13 onto the spindle, the axial length of each individual brake plunger 5, 6 which is embodied in this way can be adjusted, for example to compensate brake lining wear and when the linings are applied to the brake disk 2.

On their side facing the brake disk, that is to say on their pressure surfaces, the brake plungers 5, 6, in this case the nuts 13, are each provided with a ramp like recess or contour 14 whose lowest point preferably lies in the region of the longitudinal axis of the brake plungers.

Rolling elements 16, which are embodied here in a preferred design as balls 16, engage in each of the recesses 14.

The rolling elements 16 engage on their sides facing away from the brake disk in sliding bearing shells 17 which are embodied in accordance with the design of the rolling elements, being spherical cap shaped here, and they are inserted into recesses with a corresponding shape in a pressure plate 18 which bears against the carrier plate 19 of a brake application side brake lining 20 with brake lining material 21, which brake lining 20 is arranged in the brake caliper 1 so as to be movable parallel to the brake disk rotational axis BA and in the circumferential direction U (or tangentially or parallel to the tangential) in relation to the brake disk 2.

A clamp spring 22 between the pressure plate 18 and nuts 13 holds the pressure plate 18 with pretensioning against the nuts 13. Alternatively it is also conceivable to brace the pressure plate in some other way, for example against the housing (caliper).

An electric drive motor 23, downstream of which there is preferably arranged a step down gear mechanism 24 whose output shaft 25 acts on a further gear mechanism 26, in particular a planetary gear mechanism, which is arranged centrally between the spindles, is used for driving the brake.

In this context, the output shaft 25 drives a sun wheel 27 of the planetary gear mechanism 26 which entrains planetary wheels 28. The planetary wheels 28 intermesh (not illustrated here in detail) with the sun wheel 27 and an internally and externally toothed ring 29. Depending on the shifted state (shifting capability not illustrated here) they cause either the planetary star 33 or the ring 29 to rotate. The ring 29 intermeshes with its external toothing with gear wheels 30 which are fitted onto the spindles 12 or integrally formed onto them.

In order to switch over the drive (for example an electric motor) automatically, it is possible to provide a spring-loaded ball latching mechanism (not illustrated here). The switching over process can also be implemented in some other way (for example electromagnetically).

In an axial prolongation of the planetary star 33, a crank 34 which is of cylindrical design here and is arranged parallel to the brake disk axis is provided, said crank 34 engaging on its side facing the brake disk 2 with a crank pin 35, which is formed off-center (eccentrically) and is also aligned parallel to the brake disk axis BA, in a corresponding opening 36 in a brake lining unit, in which case the opening 36 preferably has a cross section which corresponds to the cross section of the crank pin 35.

In the exemplary embodiment in FIG. 1, the activation device or brake application unit is composed of the two adjustment pistons or brake plungers 5, 6 which are longitudinally adjustable for the purpose of wear compensation adjustment and have, in their pressure surface facing the brake disk 2, the recesses 14 in the manner of ramp contours on which the rolling elements 16 run, said rolling elements 16 transmitting the brake application force generated by the brake to the brake lining unit or to the pressure place which rests on the brake lining.

In the pressure surface of the brake lining unit or of the pressure plate 18, the rolling elements 16 are accommodated by means of a ramp profile (not illustrated here) which is of opposite configuration or in the sliding bearing bed (sliding bearing shells 17), which is preferred since the rolling elements are particularly securely guided, and is illustrated here. It would also be conceivable to have an inverted arrangement with ramps in the brake lining unit and a sliding bearing bed for the rolling elements in the brake plungers 5, 6 (not illustrated here).

The brake lining unit, composed here of the single-component or multi-component combination of brake lining 20 and pressure plate 18, is pressed in a sprung fashion against the brake plungers and adjustment pistons 5, 6 in such a way that the rolling elements 16 which are arranged between them are clamped in elastically between the brake lining unit and the brake plungers.

The brake is activated after an application process of the brake lining 20 against the brake disk through displacement of the pressure plate together with the brake lining 20 parallel to the frictional surface of the brake disk in the rotational direction or circumferential direction thereof This displacement is preferably brought about by the crank drive 35, 36 which acts approximately centrally on the pressure plate 18 of the brake lining unit 18, 20 with an output pin, here a crank pin 35, and is mounted parallel to the rotational axis of the brake disk in the brake application housing—brake caliper—1.

The crank drive is activated by means of the electric drive, for example the electric motor 23 with gear mechanism 24 connected downstream.

The lowest point of the recesses or ramps 14 is advantageously configured in each case in such a way that the rolling elements, in particular balls, are latched at the lowest point and can only be released from the depression against a minimum latching force.

The crank pin 35 is therefore mounted in the pressure plate or the brake lining unit containing it in such a way that the brake lining must follow the movement path of the crank pin 35.

Instead of activation with a crank 35, it is also conceivable to activate the pressure plate by means of a lever arrangement (not illustrated here).

One particular advantageous feature of this design is that the actuator can apply both advancing and retracting forces to the self-energization system which is composed of the brake lining with pressure plate 18, ramp pistons 31, 14 and rolling elements 16.

The self-energization system which is disclosed in FIG. 1 operates virtually without additional activation energy both in the brake application direction and in the retraction direction if the angle alpha of the ramps or boosting ramps 14 and the actual lining coefficient of friction μ satisfy the relationship $$\mu = \tan \alpha$$

If the actual coefficient of friction is less than tan α, an activation force must be applied in the brake application direction. If the actual coefficient of friction is greater than tan α, a retracting force is necessary to prevent the brake lining being pulled back to the position of maximum braking effect.

An analysis of the force conditions in the brake application direction and retraction direction including the mechanical efficiency leads to the surprising realization that with the measurement of the actuator force in the brake application direction and retraction direction it is possible to eliminate the influence of the mechanical efficiency in the transmission chain from the motor to the actuator element on the brake lining and/or also to determine the value of this mechanical efficiency.

In a method for determining a coefficient of friction which is based on this realization it is also possible to eliminate the further interference variables by not carrying out the determination of the coefficient of friction during braking processes but rather carrying it out under defined conditions during test brake activations which are initiated specifically for this purpose. This process is carried out very briefly with low braking forces, preferably on individual wheels or else individual axles of the vehicle, preferably in conjunction with air clearance adjustment processes of the electrical wear compensation adjustment system.

In air clearance adjustment processes, the idle travel, including the air clearance, are eliminated from the tensioning force transmission path. Taking into account the wear state which was additionally determined by the electronically controlled adjustment system and the temperature state which is known for the time of the test brake activation, the actuator is moved into an actuator position which, under the known peripheral conditions, results in a predefined value of the tensioning force which is constant for all the test brake activations.

The tensioning force is therefore a constant parameter for the determination of the coefficient of friction.

During the determination of the actuator force by measuring the motor current consumption, the frictional resistances constitute the largest interference influence. This influence is eliminated by precisely determining the mechanical efficiency. Temperature influences on the electric motor (permanent magnets) can be avoided through the selection of the time of the test braking operations. Fabrication tolerances are expediently compensated by a calibration process during the final testing in the mounting process of the brake.

In this way it becomes possible to precisely determine the coefficient of friction of the brake lining with a very simple testing process while maintaining constant peripheral conditions by evaluating the actuator force in the brake application activation direction and retraction activation direction, and in addition also to obtain precise information about the frictional resistances occurring in the activation system.

For the following consideration, reference is made additionally to FIGS. 3 to 6.

Figure 3:
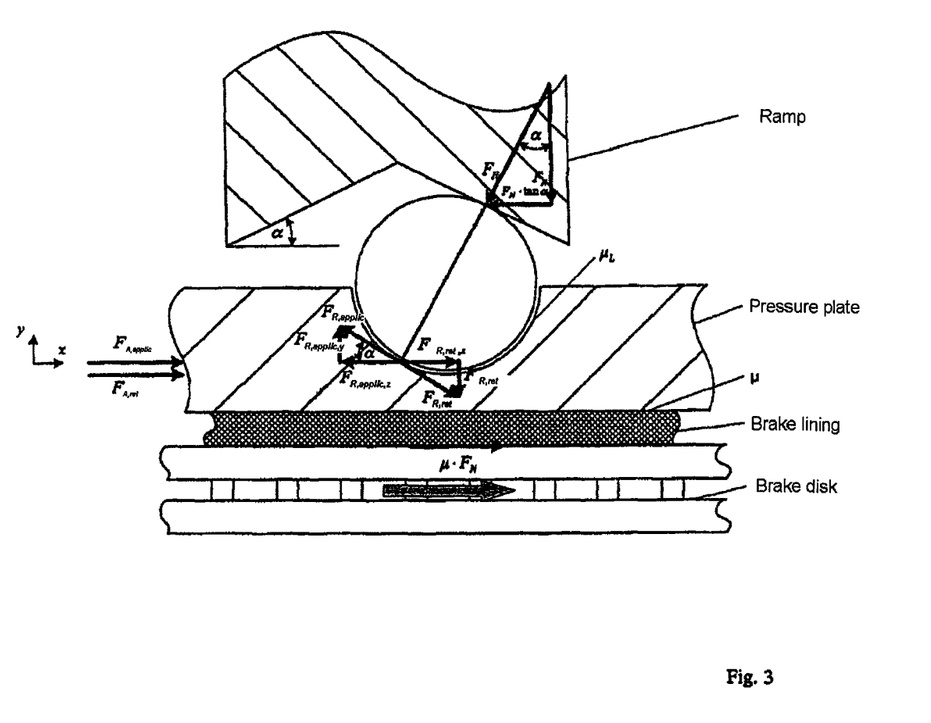
FIG. 3 is a sketch of the force conditions and angle conditions on a wedge surface of a pressure plunger of a brake of the type in FIG. 1.

The overall friction in the activation drive train can basically be reduced to the bearing friction in the wedge system. As a result the following applies $$F_R = \mu_L \cdot F_H,$$

where $\mu_L$ constitutes the friction in the overall system.

Furthermore it is the case that $$F_H = \frac{F_N}{\cos\alpha} \text{ and } F_{Rx} = F_R \cdot \cos\alpha \text{ or } F_{Rx} = F_N \cdot \mu_L.$$

The friction always counteracts the direction of movement so that the friction corresponds indirectly to a mechanical efficiency value $\eta_m$ of the activation system. The relationship $F_{Rx} = F_N \cdot \mu_L$ can therefore also be expressed as follows:

$$F_{Rx} = F_N(1-\eta_m).$$

The following applies to the brake application direction:

$$F_{A,applic} - F_N \cdot \tan\alpha + F_N \cdot \mu - F_N(1-\eta_m) = 0.$$

The following applies to the retraction direction:

$$F_{A,ret} - F_N \cdot \tan\alpha + F_N \cdot \mu + F_N(1-\eta_m) = 0.$$

The solution of the two equations according to the two unknowns μ and $\eta_m$ yields:

a) mechanical efficiency $\eta_m$ of the activation device:

$$\eta_m = 1 \frac{(F_{A,applic} - F_{A,ret})}{2F_N} \qquad (1)$$

b) the coefficient of friction μ between the brake lining and brake disk:

$$\mu = \tan\alpha \frac{(F_{A,applic} + F_{A,ret})}{2F_N}. \qquad (2)$$

The relationship between the motor armature current I and motor torque $M_M$ is described in the literature as follows:

$$M_M = M_i - M_R$$

$M_i$: internal torque
$M_R$: frictional torque values $$M_i = c \cdot \phi \cdot I = k_M \cdot I$$

c: motor constant
Φ: excitation flux
$k_M$: interlinking of flux $$M_R = k_M I_0$$

$I_0$: no load current $$M_M = k_M (I - I_0).$$

Figure 4:
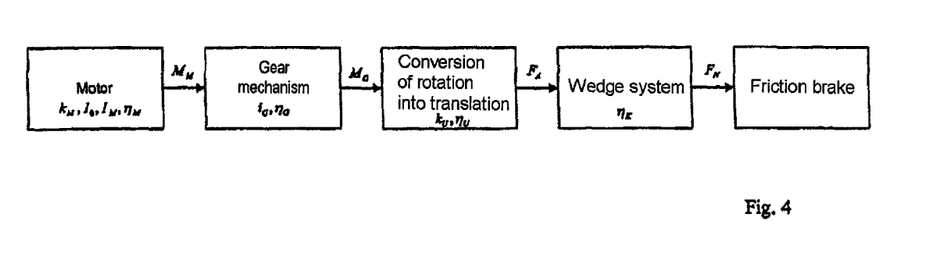
FIG. 4 is an efficiency chain.

From this relation, it is possible to determine the relationship between the armature current and the actuator force by means of the efficiency chain in FIG. 4:

$$F_A \cdot k_U = i_G \cdot \eta_M \cdot \eta_G \cdot \eta_U \cdot \eta_K \cdot M_M \quad (5)$$

$k_U$: transmission constant [m]

$$F_A = \frac{i_G \cdot \eta_M \cdot \eta_G \cdot \eta_U \cdot \eta_K \cdot k_M}{k_U} \cdot (I - I_0)$$

where $$k = \frac{i_G k_M}{k_U}$$

and $\eta_m = \eta_M \cdot \eta_G \cdot \eta_U \cdot \eta_K$ becomes $$F_A = K \cdot \eta_m \cdot (I - I_0) \quad (3).$$

K transmission constant [Vs/m]

If the difference between $F_{A,applic}$ and $F_{A,ret}$ is formed using the equation (3), the following applies:

$$F_{A,applic} - F_{A,ret} = K \cdot \eta_m \cdot (I_{applic} - I_{ret}) \quad (4).$$

If the sum is formed between $F_{A,applic}$ and $F_{A,ret}$ using the equation (3), the following applies:

$$F_{A,applic} + F_{A,ret} = K \cdot \eta_m \cdot (I_{applic} + I_{ret} - 2 \cdot I_0) \quad (5).$$

(4) inserted into (1) supplies the relation for the calculation of the mechanical efficiency of the overall system as a function of the armature current:

$$\eta_m = \frac{1}{1 + K \cdot \frac{(I_{applic} - I_{ret})}{2 \cdot F_N}}. \quad (6)$$

(5) inserted into (2) supplies the relation for calculating the coefficient of friction between the brake disk and brake lining:

$$\mu = \tan\alpha - \frac{K \cdot \eta_m \cdot (I_{applic} + I_{ret} - 2 \cdot I_0)}{2 \cdot F_N} \quad (7)$$

or [(6) into (7)]:

$$\mu = \tan\alpha - \frac{K \cdot (I_{applic} + I_{ret} - 2 \cdot I_0)}{2 \cdot F_N + K \cdot (-_{applic} + I_{ret})}$$

As a result, knowledge of the following variables is necessary to determine the coefficient of friction:

motor current for brake application direction and retraction direction $I_{applic}, I_{ret}$ no load current $I_0$ wedge angle $\alpha$ transmission constant K tensioning force $F_N$ The motor current $I_{applic}$ and $I_{ret}$ and the no load current $I_0$ are sensed by means of the motor management system of the wheel brake. The transmission constant K is known since the motor constant $k_M$, the transmission ratio $i_G$ and the transmission constant $k_U$ (conversion of the rotational movement of the drive train into a translational movement of the brake lining) are permanently installed.

To determine the tensioning force $F_N$ it is necessary for information about the following variables to be available:

wear state of the linings $t_{lining}$ caliper rigidity $c_{caliper}$ modulus of elasticity of the brake lining $E_{lining}$ wedge position $x_{wedge}$ wedge angle $\alpha$ Since the test braking operations take place during the adjustment process, the thickness of the lining can be determined with sufficient accuracy. As a result, the lining temperature, which influences the modulus of elasticity of the lining, remains as the only interference variable for the rigidity of the lining, and this is because $$c_{lining} = \frac{E \cdot A}{t}, \text{ where } E = f(T).$$

This interference variable can be compensated by extrapolating the temperature, as is known from German Patent Publication No. DE 10 2004 044940 A1.

Depending on the temperature of the lining and the wear state of the lining, a new test position $x_{wedge}$ is calculated for the determination of the coefficient of friction, and is moved into.

Figure 5:
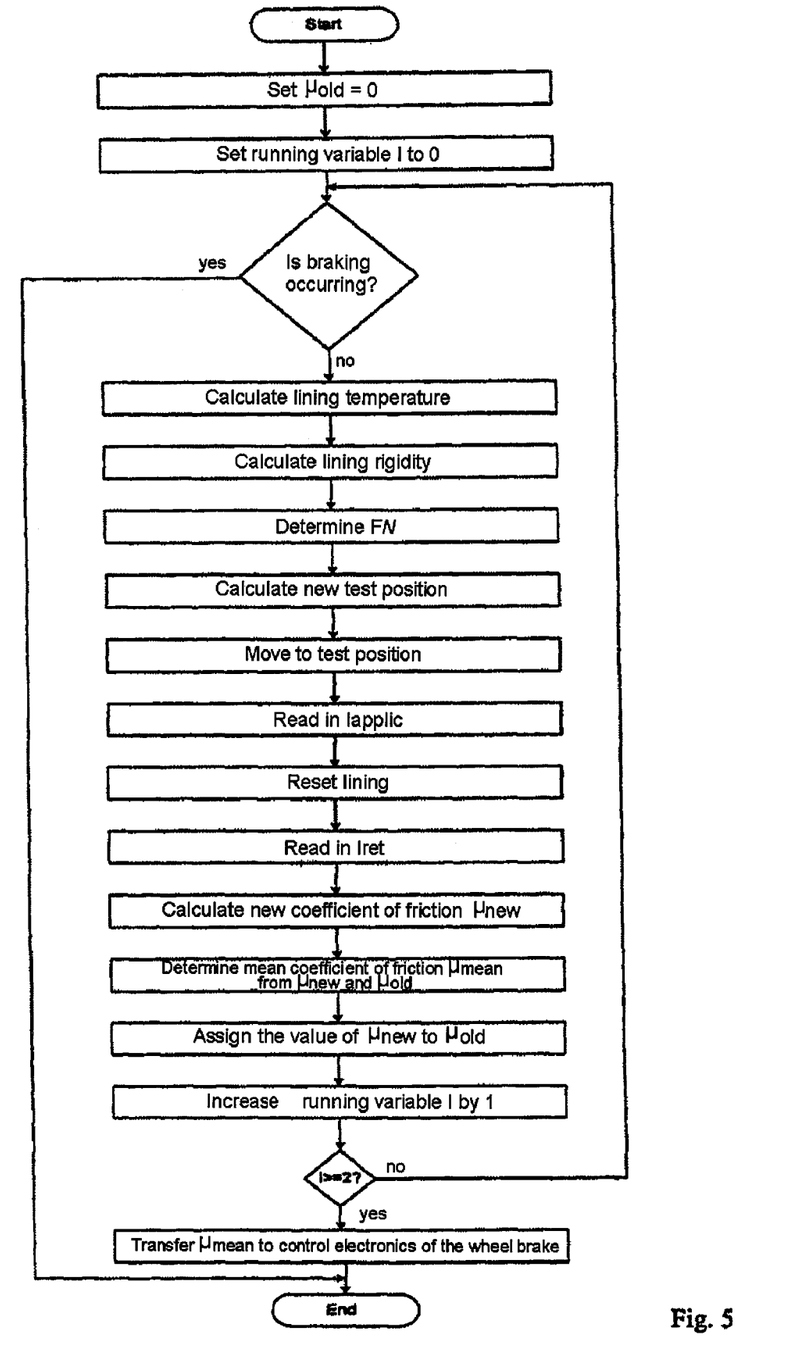
FIG. 5 is a flow chart of an embodiment of the method of the present invention.

FIG. 5 shows a program algorithm for the determination of the coefficient of friction. In the routine in FIG. 5, two partial braking operations are carried out per wheel brake, with the result that a mean value can be formed from the two determined coefficients of friction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

Brake caliper 1
Brake disk 2
Openings 3, 4
Brake plungers 5, 6
Sliding bearing shells 9, 10
Rear wall 11
Spindle 12
Nut 13
Ramp like recess 14
Rolling elements 16
Sliding bearing shells 17
Carrier plate 19
Brake lining 20
Brake lining material 21
Clamp spring 22
Drive motor 23
Step down gear mechanism 24
Output shaft 25
Gear mechanism 26
Sun wheel 27
Planetary wheels 28
Ring 29
Gear wheels 30
Flange 31
Compression springs 32
Planetary star 33
Crank 34
Crank pin 35
Opening 36

What is claimed is:

1. A method for determining a coefficient of friction of a self-energizing disk brake with a brake application device having an brake application electric motor, operable to apply brake application forces and retracting forces to the brake lining, comprising the steps of:
   determining an application motor current ($I_{applic}$) of the brake application device electric motor in a brake application direction;
   determining a retraction motor current ($I_{ret}$) of the brake application device electric motor in a brake retraction direction;
   determining a no load motor current ($I_0$) of the brake application device; and
   determining the coefficient of friction as a function of the application motor current, retraction motor current, a predetermined wedge angle ($\alpha$), a predetermined transmission constant (K) and a predetermined tensioning force ($F_N$).

2. The method as claimed in claim 1, wherein the coefficient of friction is determined under defined conditions during test brake activations.

3. The method as claimed in claim 2, wherein the coefficient of friction between the brake disk and brake lining is determined according to the function:

$$\mu = \tan\alpha - \frac{K \cdot \eta_m \cdot (I_{applic} + I_{ret} - 2 \cdot I_0)}{2 \cdot F_N}$$

or according to:

$$\mu = \tan\alpha - \frac{K \cdot (I_{applic} + I_{ret} - 2 \cdot I_0)}{2 \cdot F_N + K \cdot (I_{applic} + I_{ret})}$$

wherein $\eta_m$ is a mechanical efficiency in a transmission chain from the brake application device electric motor to an actuator element on the brake lining.

4. The method as claimed in claim 3, wherein during the test brake activations an influence of a mechanical efficiency in the transmission chain from the motor to the actuator element on the brake lining is eliminated and the mechanical efficiency is determined on the basis of a measurement of the force applied by the brake application device in the brake application direction and retraction direction.

5. The method as claimed in claim 3, wherein a plurality of self-energizing disk brakes are arranged in at least one axle of a vehicle, and the test braking operations are carried out briefly with low braking forces applied on at least one of individual wheels and individual axles of the vehicle.

6. The method as claimed in claim 3, wherein the test braking operations are carried out in conjunction with air clearance adjustment processes of a wear compensation adjustment system which is driven by electric motor.

7. The method as claimed in claim 3, wherein fabrication tolerances are determined by a calibration process during a final testing in a mounting process of the brake.

8. The method as claimed in claim 3, further comprising the step of:
   during test brake applications, while maintaining constant peripheral conditions while evaluating the actuator force in the brake application activation direction and retraction activation direction, determining the mechanical efficiency ηm in the transmission chain from the motor to the actuator element on the brake lining in order to determine the frictional resistances occurring in the brake application device.

9. The method as claimed in claim 8, wherein the mechanical efficiency $\eta_m$ of the brake application device is determined by the function:

$$\eta_m = 1 - \frac{(F_{A,applic} - F_{A,ret})}{2 \cdot F_N}$$

and the coefficient of friction µ between the brake lining and brake disk is determined according to the function:

$$\mu = \tan\alpha - \frac{(F_{A,applic} + F_{A,ret})}{2 \cdot F_N}.$$

10. The method as claimed in claim 9, wherein the mechanical efficiency of the overall system is determined as a function of the armature current according to the function:

$$\eta_m = \frac{1}{1 + K \cdot \frac{(I_{applic} - I_{ret})}{2 \cdot F_N}}.$$

11. The method as claimed in claim 10, wherein the brake application motor current $I_{applic}$, the brake retraction motor current $I_{ret}$ and the no load motor current $I_0$ are sensed by a motor management system of the wheel brake.

12. The method as claimed in claim 3, wherein the tensioning force is determined as a function of a wear state of the linings ($t_{lining}$), a caliper rigidity ($c_{caliper}$), a modulus of elasticity of the brake lining ($E_{lining}$), a wedge position ($x_{wedge}$), and the wedge angle α, according to the functions:

Determination of the normal force:

$$c_{lining,tot} = \frac{E_{lining} \cdot A_{lining}}{2 \cdot t_{lining}}$$

$$F_N = x_{wedge} \cdot \tan\alpha \cdot \frac{c_{caliper} \cdot c_{lining,tot}}{c_{caliper} + c_{lining,tot}}$$

13. The method as claimed in claim 12, wherein the lining temperature (t) is determined computationally from brake information.

14. The method as claimed in claim 3, wherein at least two partial braking operations are carried out per wheel brake, and in that a mean value is formed from the at least two determined coefficients of friction.

* * * * *